United States Patent Office.

JULIUS ABEL, OF MANNHEIM, GERMANY, ASSIGNOR TO BADISCHE ANILIN & SODA FABRIK, OF LUDWIGSHAFEN, GERMANY.

BLUE SULFUR DYE AND PROCESS OF MAKING SAME.

SPECIFICATION forming part of Letters Patent No. 679,199, dated July 23, 1901.

Application filed March 19, 1901. Serial No. 51,874. (No specimens.)

*To all whom it may concern:*

Be it known that I, JULIUS ABEL, a doctor of philosophy and a chemist, a citizen of the free Hansa town of Hamburg, residing at Mannheim, in the grand duchy of Baden, Germany, have invented new and useful Improvements in Blue Coloring-Matter, of which the following is a specification.

If equimolecular proportions of a dialkyl-para-phenylene-diamin thiosulfonic acid and a phenol be oxidized together—say, for instance, with potassium bichromate in acetic-acid solution—a dialkyl-amido-indophenol-thiosulfonic acid can be obtained. I have discovered that new blue coloring-matter of great value can be obtained by moderately heating such a dialkyl-amido-indophenol-thiosulfonic acid—for instance, diamethyl-amido-indophenol-thiosulfonic acid—with sulfur and sodium sulfid. The coloring-matter so obtained contains sulfur and dyes unmordanted cotton in the presence of sodium sulfid blue shades. It can also be dyed from a vat in a manner similar to indigo. Various beautiful shades of blue are obtained which possess excellent fastness.

My new coloring-matter is soluble in concentrated sulfuric acid with a pure-blue color and is also soluble in an aqueous solution of sodium sulfid, but is practically insoluble in pure water, hydrochloric acid, or dilute sodium-carbonate solution. On treating it with a suitable quantity of a solution of sodium sulfid it first yields a blue solution. On the addition of more sodium sulfid and heating the blue color disappears and a leuco compound of my new coloring-matter is formed. The said leuco compound is precipitated from the said solution by the addition of hydrochloric acid and can be collected by filtration and purified by washing with water. In this form it is practically insoluble in carbonate-of-soda solution.

The following example will serve to illustrate a method of carrying my invention into practical effect; but my invention is not confined to this case nor to the conditions described in the example. The parts are by weight.

Example: Take fifty (50) parts of dimethyl-amido-indophenol-thiosulfonic acid (such as can be obtained from dimethyl-para-phenylene-diamin-thiosulfonic acid and phenol) and add them to a solution or mixture of one hundred and twenty (120) parts of sodium sulfid and fifty (50) parts of sulfur in fifty (50) parts of water. Raise the temperature gradually to about one hundred and twenty-five (125°) degrees centigrade. Continue heating for several hours. The mass assumes the character of a dye-vat, and a test portion diluted with water on exposure to the air—say on filter-paper—yields an intensely-blue coloring-matter. When this point is reached, dilute the entire mixture with hot water and filter to separate from any insoluble impurity. The greenish-colored filtrate contains the new coloring-matter in the form of its leuco compound and can, if desired, be at once used for dyeing cotton, as cotton is dyed with indigo from the vat. To separate the coloring-matter, blow air through the solution, add common salt to complete the precipitation of the coloring-matter and collect it in the usual way. It is thus obtained in the form of a blue powder with coppery luster. If desired, the leuco compound can be salted out before oxidizing.

Analogous dialkyl-amido-indolphenol-thiosulfonic acids (such as can be obtained from the same or other dialkyl-para-phenylene-diamin-thiosulfonic acids and phenol or its analogues) are equivalent to the above-mentioned dimethyl-amido-indophenol-thiosulfonic acid for the purposes of my invention.

Now what I claim is—

1. The process of producing new blue coloring-matter by treating dialkyl-amido-indophenol-thiosulfonic acid with sulfur and sodium sulfid, substantially as described.

2. The process of producing new blue coloring-matter by treating dimethyl-amido-indophenol-thiosulfonic acid with sulfur and sodium sulfid, substantially as described.

3. The new blue coloring-matter containing sulfur which is practically insoluble in pure water, hydrochloric acid or dilute carbonate-of-soda solution, which on suitable reduction with sodium-sulfid solution is converted into the form of leuco compound which is precipitated from its solution in sodium sulfid by hydrochloric acid and is practically insoluble in carbonate-of-soda solution, substantially as described.

In testimony whereof I have hereunto set my hand in the presence of two subscribing witnesses.

JULIUS ABEL.

Witnesses:
 ERNEST F. EHRHARDT,
 JOHN L. HEINKE.

It is hereby certified that in Letters Patent No. 679,199, granted July 23, 1901, upon the application of Julius Abel, of Mannheim, Germany, for an improvement in "Blue Sulfur Dyes and Processes for Making Same," an error appears in the printed specification requiring correction, as follows: Page 1, line 18, the word "diamethyl" should read *dimethyl;* and that the said Letters Patent should be read with this correction therein that the same may conform to the record of the case in the Patent Office.

Signed, countersigned, and sealed this 15th day of October, A. D., 1901.

[SEAL.]
F. L. CAMPBELL,
*Assistant Secretary of the Interior.*

Countersigned:
E. B. MOORE,
*Acting Commissioner of Patents.*